UNITED STATES PATENT OFFICE.

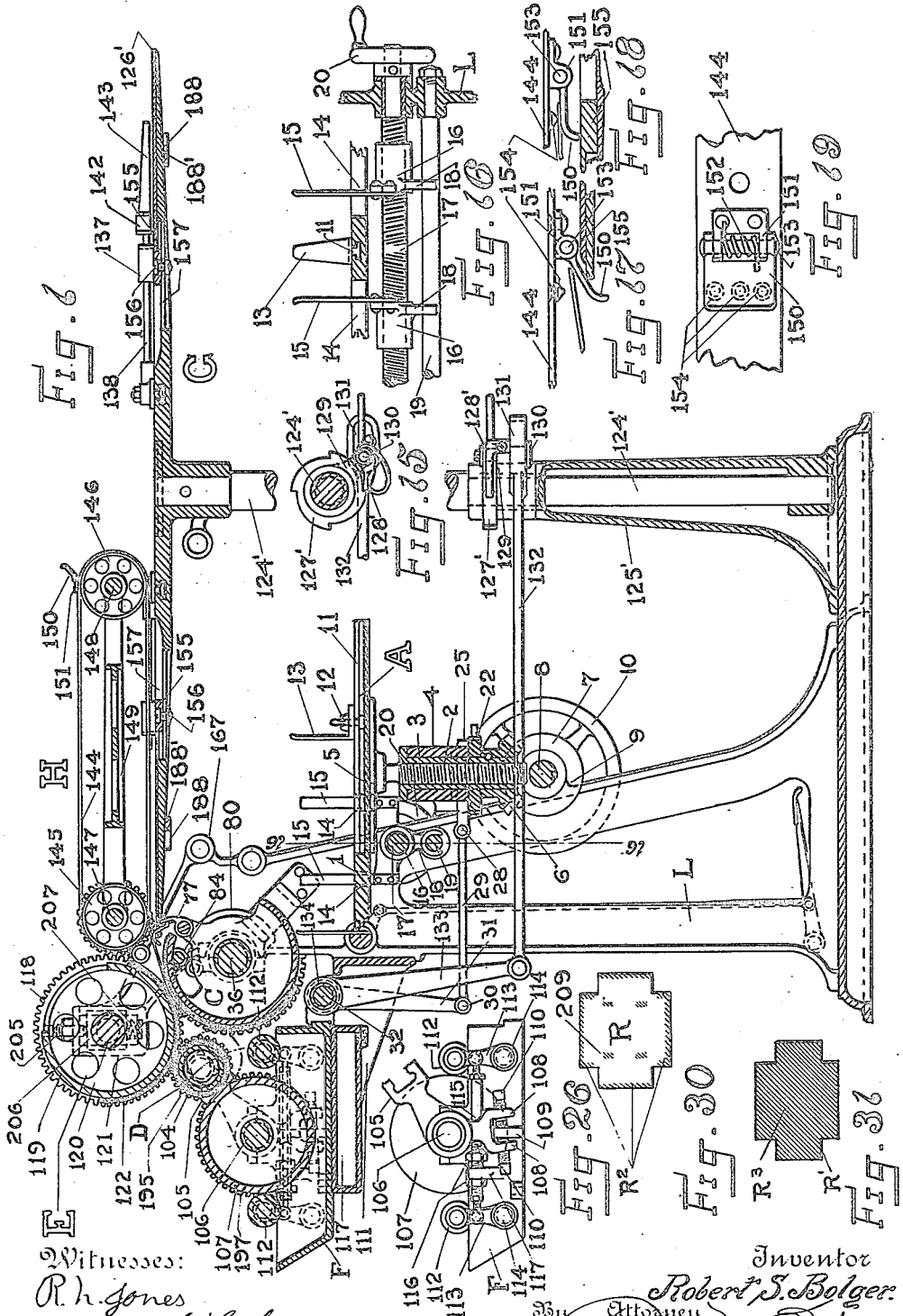

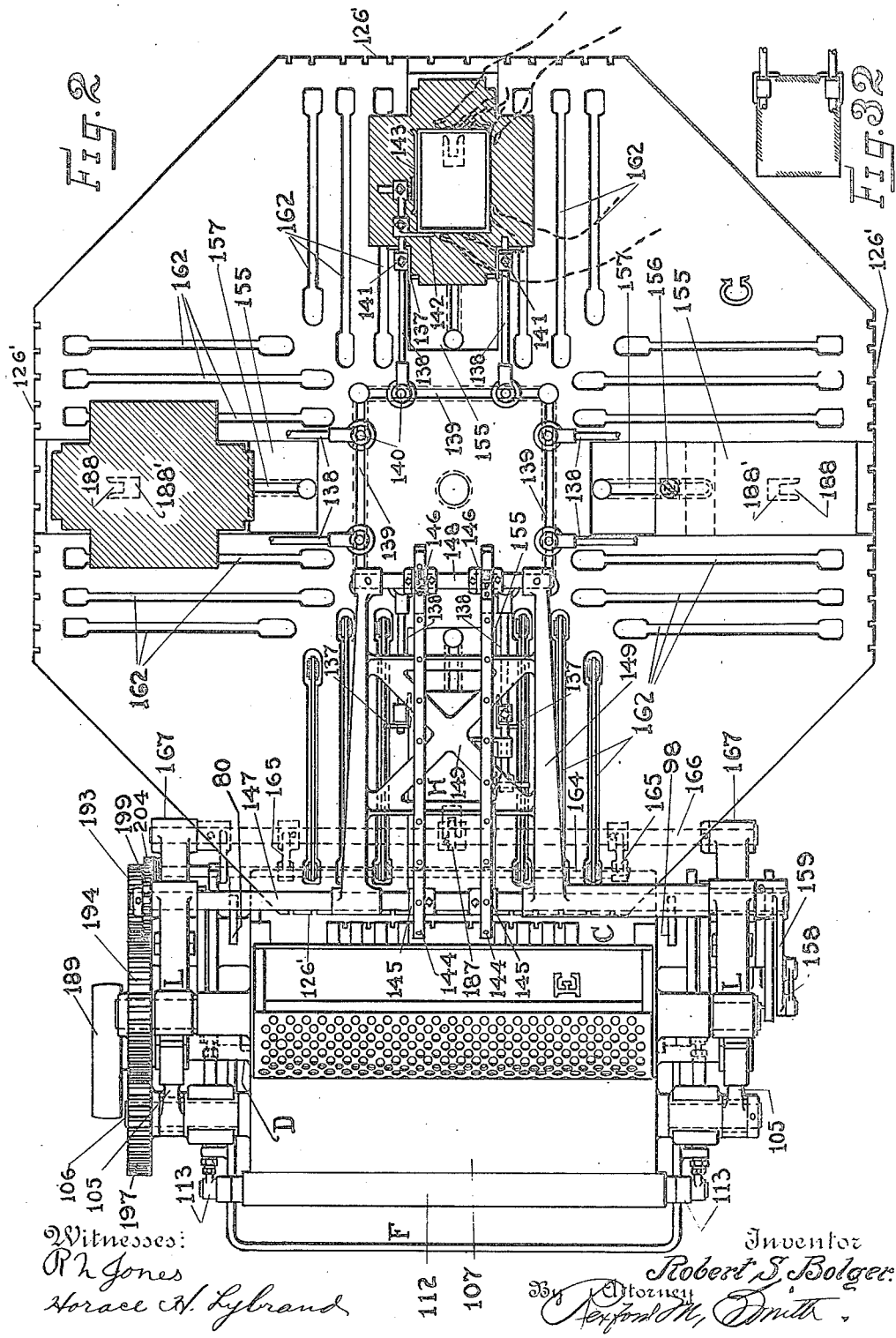

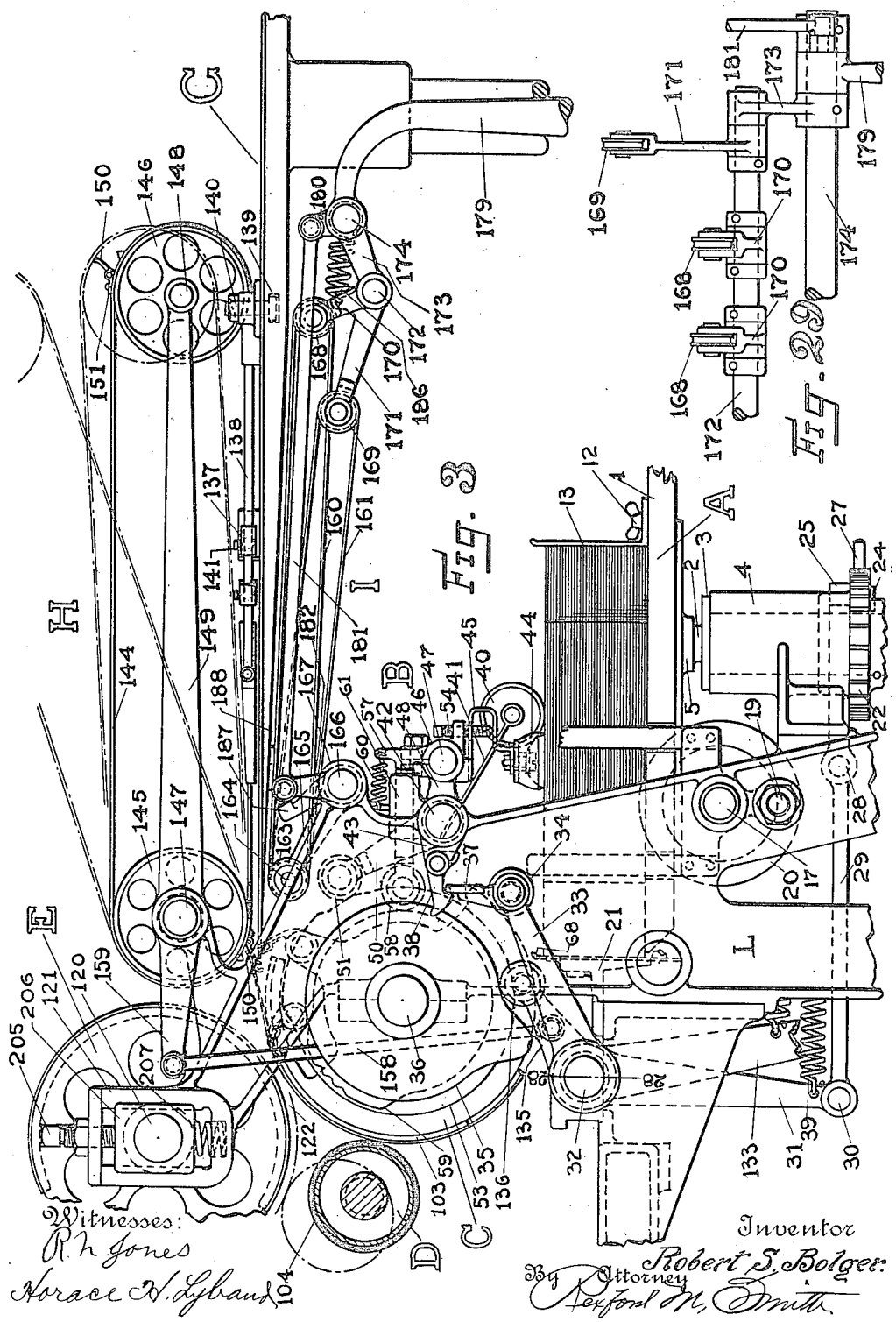

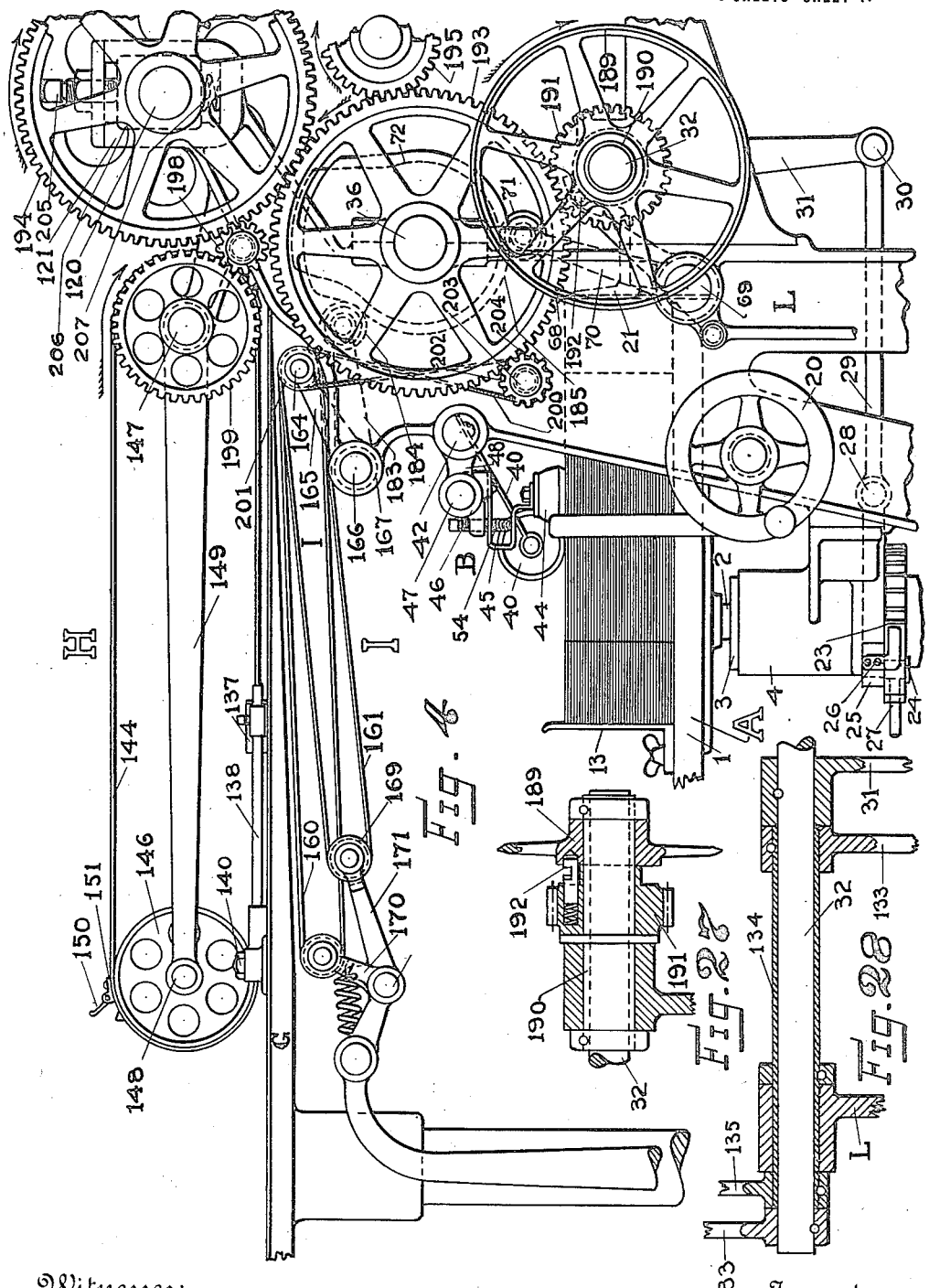

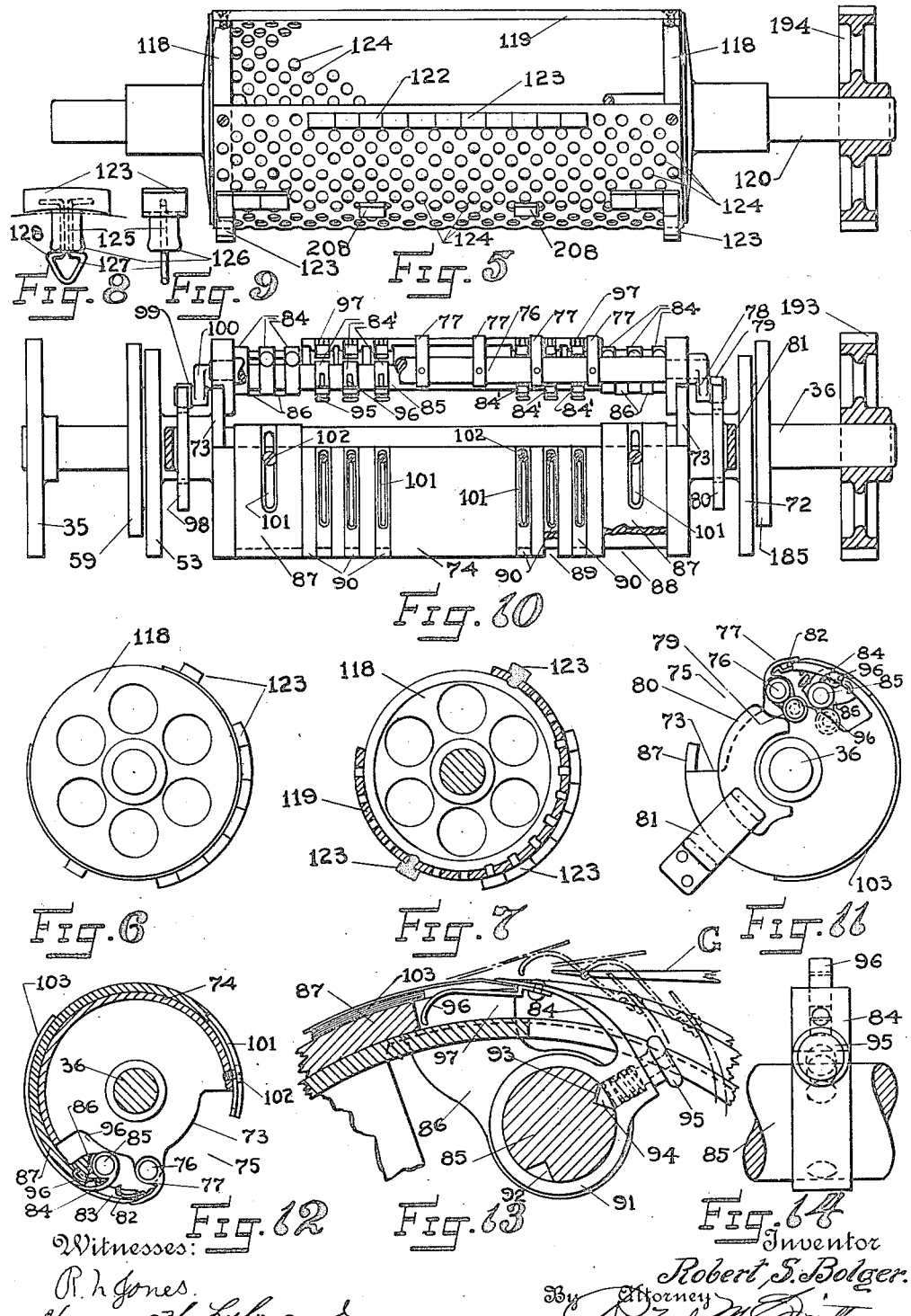

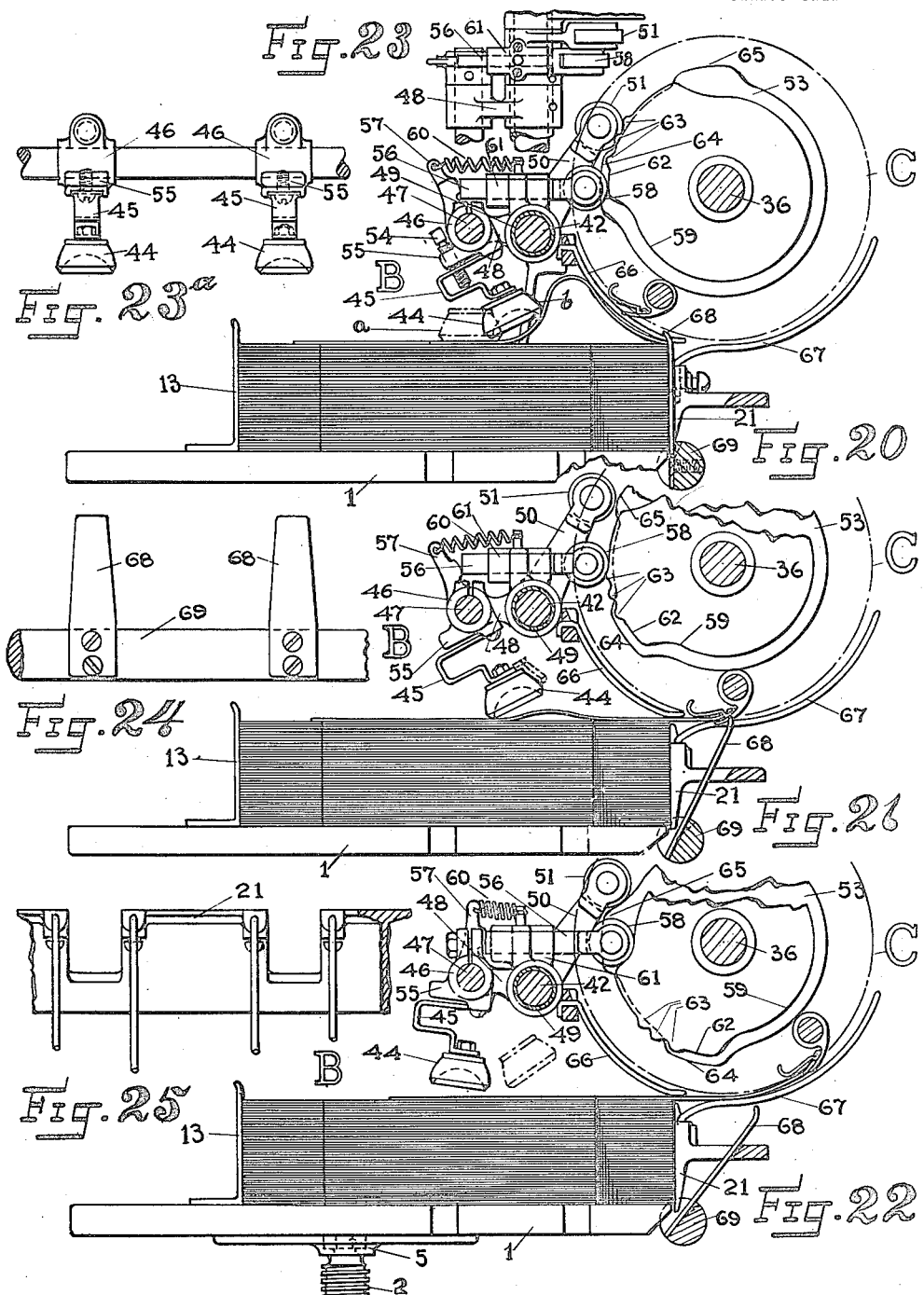

ROBERT S. BOLGER, OF RICHMOND HILL, NEW YORK.

GUMMING-MACHINE FOR BOX-COVER WRAPPERS.

1,194,702.

Specification of Letters Patent.  Patented Aug. 15, 1916.

Application filed September 10, 1910. Serial No. 581,399.

*To all whom it may concern:*

Be it known that I, ROBERT STANLEY BOLGER, a citizen of the United States, residing at Richmond Hill, in the county of Queens and State of New York, have invented a certain new and useful Gumming-Machine for Box-Cover Wrappers, of which the following is a specification, reference being had therein to the accompanying drawing.

This invention relates to a machine for gumming box wrappers automatically so as to prepare them to be applied to previously-formed boxes either manually or by machinery.

One of the principal objects of the present invention is to provide a gumming machine which is convertible for surface gumming of the wrappers or marginal gumming thereof, so that the machine can prepare the wrappers for producing what is known as tight or loose wrapped boxes, tight wrapped boxes being those in which the wrappers are attached to the bottoms, sides and ends of the boxes and the marginal edges of the wrapper turned in and attached to the side and end walls of the box, while in the loose wrapped boxes the wrappers are attached to the boxes only at the margins by the edges being turned in and gummed to the side and end walls of the boxes.

Another important object is to so design the gum-applying drum for marginally gumming the wrappers that the drum can be readily converted for use on wrappers of various sizes and configurations without the necessity of removing the drum from the machine.

Another object of the invention is the employment of a novel wrapper or sheet-feeding device for accurately feeding the wrappers one at a time from a pile holder or table to a rotary platen which carries the wrappers successively into coöperative relation with the gum-applying mechanism.

A further object is the provision of a rotary delivery table to which the gummed wrappers are successively transferred so that an attendant can place the formed boxes on the gummed wrappers one at a time and deliver them either to a machine for folding and attaching the wrappers to the boxes or to a table where the wrappers can be applied by hand.

Further, the invention has as its object to provide a novel and effective means for carrying the gummed wrappers from the platen cylinder to the periodically rotated delivery table.

With these and other objects in view, the invention comprises the various novel features of construction and arrangement of parts which will be more fully described hereinafter and set forth with particularity in the claims appended hereto.

In the accompanying drawings, which illustrate one embodiment of the invention, Figure 1 is a central vertical longitudinal section of the machine. Fig. 2 is a plan view thereof. Figs. 3 and 4 are enlarged fragmentary views of opposite sides of the machine. Fig. 5 is a plan view of the marginal gumming drum. Figs. 6 and 7 are, respectively, end and transverse views thereof. Figs. 8 and 9 are side and end views of one of the sections of the gum-applying surface of the marginal gumming drum. Fig. 10 is a plan view of the platen cylinder. Fig. 11 is an end view thereof. Fig. 12 is a transverse section of the platen cylinder. Fig. 13 is a detail sectional view of one of the grippers of the platen cylinder. Fig. 14 is a front view of one of the grippers. Fig. 15 is a detail sectional view of the operating means for revolving the rotary delivery table. Fig. 16 is a vertical section on line 16—16, Fig. 1, to show the adjustable side gages of the pile holder. Figs. 17 and 18 are detail views of the grippers on the endless belts forming the gummed wrapper transferring mechanism. Fig. 19 is a bottom plan view of Fig. 17. Fig. 20 is a detail sectional view of the wrapper-feeding device in its relation to the pile holder and platen cylinder, the device being represented as having gone through the first stage in the feeding operation by buckling the upper wrapper. Figs. 21 and 22 are similar views showing succeeding steps in the movement of the wrapper-feeding device. Fig. 23 is a fragmentary plan view of the wrapper device. Fig. 23ª is a front view thereof. Fig. 24 is an elevation of the gage members at the front end of the pile holder or table. Fig. 25 is a plan view of the guides which support the wrapper under the platen cylinder as the latter draws such wrapper from the pile holder. Fig. 26 is a side view of the gumming mechanism. Fig. 27 is a detail sectional view of the clutch for throwing the machine into and out of operation. Fig. 28 is a detail section on line 28—28, Fig. 3. Fig. 29 is a fragmentary plan view of portions of the wrapper-transferring mechanism located under the delivery table. Figs. 30 and 31 are plan views, respectively, of marginal and superficially gummed wrappers for loose and tight wrapped boxes. Fig. 32 is a fragmentary plan view of the wrapper gages set for wrappers without cut out corners.

Before entering into a detailed description of the construction of the machine, the principal parts thereof will be generally stated in their coöperative relation.

The machine as a whole comprises generally a pile table or holder A, in which the wrappers are arranged in a vertical pile; a feeding mechanism B located above the pile holder and periodically actuated so as to feed wrappers successively therefrom; a platen cylinder C located in front of the wrapper-feeding mechanism to receive the successive wrappers therefrom; a surface gumming roll or drum D mounted to be adjusted toward or from the platen cylinder to apply gum to the entire surface of each wrapper as the same is carried by the cylinder in contact with the surface gumming roll; a marginal gumming roll E so related to the surface gumming roll that the latter can act as means for transferring gum to the marginal gumming roll for gumming the surface thereof so that the wrappers on the platen cylinder can have their margins gummed; a gumming fount or reservoir F for applying gum direct to the surface gumming roll or indirect to the marginal gumming roll through the medium of the surface gumming roll; a periodically rotated delivery table G arranged in coöperative relation with the platen cylinder to receive successively the gummed wrappers from the latter so that such wrappers will be conveyed to the operator who places the boxes on the gummed wrappers and removes the boxes with the wrappers adhering thereto; a main transferring mechanism H for removing the gummed wrappers from the platen cylinder and properly positioning them on the delivery table; and a secondary transfer mechanism I coöperating with the main transfer mechanism to insure the proper positioning of the gummed wrappers on the delivery table.

The purpose of the machine is to apply gum to wrappers of any desired form such as R and R', Figs. 30 and 31, and the gum can be applied to the marginal edge of the wrapper as indicated by the shaded part $R^2$, Fig. 3, or it can be applied to the entire surface as at $R^3$, Fig. 31, so that the wrappers can be used for loose or tight wrapped boxes.

Referring to Figs. 1, 3 and 4, of the drawings, the pile holder A is shown to consist of a flat horizontal table 1 which is mounted on a vertical screw 2 that is threaded in a nut or rotary sleeve 3 held in a vertical bearing 4 forming part of the main frame L, which frame may be of any approved construction. The upper end of the screw is connected with the table by a swivel joint 5 so that the screw can turn without imparting rotation to the table. On the lower end of the elevating sleeve 3 is a miter gear 6 that meshes with the miter gear 7 on a horizontal shaft 8 that is journaled in bearings 9 on the frame L, there being on the shaft a hand wheel 10 whereby the table can be manually raised or lowered. The table, as shown in Figs. 1 and 16, has a longitudinal slot 11 of T-shaped cross section for receiving bolts 12 that secure upright adjustable gages 13 to the table to engage the back edge of the pile of wrappers that rest on the table. The table is also provided with transversely-extending slots 14 through which extend vertical side gages 15. The gages 15 at each side of the pile are mounted on a nut 16 which is held from rotation on the screw 17 by a lug 18 on the nut slidably engaging a fixed rod 19 supported by the main frame L and extending transversely under the table. The screw 17 has right and left hand threads with which the nuts 16 of the side gages engage so that by rotating the screw, which is journaled on the main frame L, the side gages can be moved toward or from each other, the said screw having a hand wheel 20 at one end as shown in Fig. 16. At the front of the pile holder is a stationary wall 21 against which the front edges of the wrappers engage. It will thus be seen that by properly adjusting the side gages 15 and the rear end gage 13, the pile holder A can be adapted for wrappers of various sizes.

The automatic feeding mechanism for the pile holder is of such a nature that intermittently the table will be elevated a step equivalent to the thickness of any desired number of wrappers. The miter gear 6 which turns the table elevating sleeve 3 is provided with ratchet teeth 22 with which meshes a pawl 23 that is pivoted on the stud 24 fastened to a slide 25 immediately above the ratchet wheel. This pawl is pressed by a spring 26 against the ratchet wheel and on the pawl is a handle 27 whereby the pawl can be held out of engagement with the ratchet wheel when the operator turns the hand wheel 10 for the purpose of manually setting the feed table 1 to proper elevation. The pawl-carrying slide 24 is hingedly connected at 28 with a link 29 which is connected at 30 with a lever 31. The lever 31, as shown in Figs. 1 and 3, is mounted on a horizontal shaft 32 supported on the main frame L, and this lever has an upper arm 33 that carries a roller 34 which is adapted to be engaged by a cam 35 which is fastened to the shaft 36 of the platen cylinder. The roller 34 is held out of the path of the high portion of the cam 35 while the feed table is stationary, and for this purpose the arm 33 is provided with a projection or catch 37 that is engaged by a catch 38 which is automatically released when the pile on the table lowers to a predetermined point, and by being thus released the roller will be thrown into the path of the cam by the contraction of a helical spring 39 connected with the lever 31 so that as the cam rotates, the lever 31 will be oscillated and will cause the elevating sleeve 3 to be turned by the pawl and ratchet device. Consequently, the table is raised to restore the top of the pile to the normal level and at this time the latch 38 is automatically reset to hold the roller 34 away from the cam until the pile table must be raised another step. The automatic releasing of the catch is effected by a roller weight 40, Fig. 3, that is journaled on a lever 41 fastened to the horizontal shaft 42, so disposed above the table 1 that the roller weight will rest on the top wrapper of the pile. On the shaft 42 is an arm 43 to which is hingedly connected the latch 38, so that as the roller weight descends, it will cause the arm 43 to swing upwardly and disengage the catch 38 from the catch 37.

The wrapper feeding mechanism B, Figs. 3, 4, 20, 21, 22 and 23ᵃ, is located above the pile of wrappers and the uppermost wrapper is adapted to be engaged by a plurality of yielding cups 44 which are inverted and supported on C-shaped springs 45, the bottom edge of each cup being continuous and relatively sharp so that an effective picking up or gripping engagement can be produced. The springs 45 are fastened to collars 46 fixed on the shaft 47 which is supported on arms 48 projecting from the sleeve 49 surrounding the shaft 42. On the shaft 42 is an upwardly-extending arm 50 that carries a roller 51 arranged to ride on a cam 53 fastened to the shaft 36. This cam 53 causes the arms 48 to swing up and down to bring the gripping or suction cups 44 into and out of engagement with the uppermost wrapper. The C-shaped springs on which the cups are mounted can be set to any desired tension by adjusting screws 54 threaded in lugs 55 on the collars 46, said screws engaging the lower members of the springs, the upper members thereof being anchored on the collars 46. After the cups are brought flat into engagement with the upper wrapper, the collars 46 are rocked to shift the cups from the dotted line position a, Fig. 20, to the full line position b for the purpose of buckling the front portion of the uppermost wrapper. This rocking is effected by a slide 56 that engages an arm 57 fixed on one end of the shaft 47, the said slide having a roller 58 which rides on a cam 59 located on the platen cylinder shaft 36 adjacent the cam 53. The slide roller 58 is held yieldingly against the cam 59 by a spring 60 connected with the arm 57 and with the bearing 61 in which the slide moves, the said spring also serving to hold the lever 50 with its roller 51 against the cam 53. The cam 59 has a high portion 62 which causes the wrapper-gripping cups 44 to swing forwardly and upwardly for the buckling action of the upper wrapper, but the high portion 62 has an undulatory surface 63 for the purpose of causing a rapid vibratory action to be transmitted to the cups, so that they will shake loose the second wrapper in case the same adheres to the uppermost wrapper during the buckling action. The cam 53 has two high surfaces 64 and 65, and it is only after the high portion 64 passes the roller 51 that the cups begin to swing. As the roller 51 passes off the high portion 64, the cups are caused to travel parallel to and in contact with the uppermost wrapper, then swing forward and upwardly and during this pushing and swinging movement the upper wrapper will be buckled so that any suction of the cups on the wrapper will be broken. The other high portion 65 of the cam 53 will hold the cups off the pile during their downward or return movement at the time the roller 58 rides off the high portion of the cam 59, and as a result the cups will not interfere with the forward movement of the upper wrapper which is picked up by the platen cylinder before the cups return to normal position.

In Fig. 21, the vibratory action of the cups is shown and the wrapper has been forced by means of the buckle forwardly over the front plate 21 of the feed table, the front edge of the wrapper being gripped by the grippers of the platen cylinder. In Fig. 22, the cups are shown in their returning movement while the platen cylinder proceeds to draw out the uppermost wrapper from the pile holder. To guide the buckled wrapper in its forward movement out of the pile holder, a set of curved guides 66 are arranged above the forward part of the pile holder and approximately concentric with the platen cylinder C. The lower ends of these guides 66 terminate immediately above the front plate 21 of the pile holder. Mounted on this front plate are arcuate guides 67 approximately concentric with the platen cylinder so as to support the front edge of the wrapper in proper relation to the grippers on the platen cylinder. In order to prevent the upper wrapper from moving out between the guides 66 and 67 during the buckling action, retaining fingers 68 are arranged at the front plate 21 of the pile holder and these fingers are mounted on a rock shaft 69 that is rocked at such a time that as the fingers 68 move downwardly and forwardly the buckled portion of the wrapper will snap forwardly controlled by the fingers 68 and cause the front edge thereof to slip into the gripper on the cylinder which, at that moment, is carried into line with the front edge of the wrapper. During the return movement of the fingers 68, the said fingers serve as stackers to return any wrappers that might be drawn forwardly in the pile holder as the advancing wrapper is withdrawn by the rotating platen cylinder. The shaft 69 that supports the fingers 68 is rocked by an arm 70, Fig. 4, secured to the end of the shaft, said arm having a roller 71 which rides on the cam 72 fastened on the platen cylinder shaft.

The platen cylinder C, Figs. 10 to 14, inclusive, consists of heads 73 fastened on the shaft 36 and a cylindrical shell 74, said shell being continuous through approximately two hundred and seventy degrees. The remaining part of the circumference of the shell is open as indicated at 75, Figs. 11 and 12. Extending longitudinally of the platen cylinder is a shaft 76 having its ends rotatably mounted in heads 73, and on this shaft are arranged grippers 77 in spaced relation, said grippers being in the form of curved fingers that project out of the opening 75 of the cylinder and are adapted to bear against the edge of the cylinder at the opening for gripping the front edge of the wrapper. On one end of the shaft 76, as shown in Fig. 10, is a crank arm 78 which has a roller 79 riding on a cam 80 fixed on a stationary bracket 81 fastened to the frame of the machine so that as the cylinder rotates, the gripper shaft will rock to open and close the grippers, the cam being so positioned that the grippers will open at the proper time to deliver the gummed wrapper to the wrapper-transferring mechanism and will close when the next wrapper is fed to the platen so as to pick up the wrapper and carry it around through the gum-applying mechanism. Each gripper 77 has a curved finger 82, Fig. 12, which moves inwardly and outwardly through a slot 83 in the shell of the cylinder at the edge thereof. These fingers of the grippers form lifters to raise the edge of the wrapper as the grippers open at the time the delivery table is reached, so that the wrapper can pass on to the latter. The lifting fingers also form guides to direct the wrapper under the grippers at the time the wrapper is fed from the wrapper holder to the platen. The grippers 77 are adapted to grip the front edge of the wrapper while a second set of grippers 84 are adapted to grip the front edges of the side flaps of the wrapper. These grippers 84 are mounted on a shaft 85 which is supported in lugs 86 that extend into the platen cylinder, said lugs being mounted on rings 87 that are sprung into grooves 88 extending around the shell 74 adjacent the ends of the cylinder. These rings are adjustable around the cylinder so as to shift the second set of grippers 84 toward or from the front grippers 77, according to the distance of the front edge of the side flaps of the wrapper from the front edge of the wrapper gripped by the grippers 77. A plurality of grippers 84 are arranged on the shaft 85 in line with the rings 87 so that the rings will form supports or abutments against which the wrapper will be clamped by such grippers 84. Other grippers 84' are arranged on the shaft 85 inwardly from the rings 87, and extending around the cylinder set in grooves 89, Fig. 10, are rings 90 disposed in line with these last-mentioned grippers 84', so that the ends of the rings adjacent the grippers will form supports or abutments against which the wrapper will be clamped. All the grippers 84 and 84' are mounted on the shaft 85, as shown in Fig. 13, each gripper being formed with a collar 91 which can slide around the shaft 85 to move the grippers to operative or inoperative position. The shaft 85 has sockets 92 and 93 and on each collar is a spring-pressed pin 94 which, when it engages the socket 93, as shown in Fig. 13, will hold the gripper operative, but when the pin is engaged in the socket 92, it will hold the gripper in inoperative position or drawn into the platen cylinder. As shown in Fig. 10, only those grippers 84 disposed in line with the rings 87 are operative, while the other grippers 84' in line with the rings 90 are in inoperative position. This means that the platen is set for wrappers of large size, because only the grippers 84 near the ends of the platen cylinder are in use. The locking pins 94 are provided with knobs 95 so that they can be conveniently manipulated. The grippers 84 and 84' are also provided with lifting fingers 96 that perform the same function as the lifting fingers 82 of the grippers 77, and these fingers 96 move in and out of slots 97 in the wrapper-supporting ends of the rings 87 and 90, the said slots being of less width than the grippers so that the rings will form supports against which the grippers can clamp the wrapper.

In Fig. 13, the manner in which the lifting fingers 96 and 82 operate to raise the front edge and tab edge of the wrapper above the level of the delivery table G is clearly illustrated. The grippers 84 are opened and closed by a stationary cam 98 fastened on the frame of the machine and located at the end of the plated cylinder opposite from the stationary cam 80, and on this cam 98 rides a roller 99 on the crank arm 100 secured to the end of the shaft 85 for the rear set of grippers. The rings 87 and 90 have, as shown clearly in Figs. 10 and 12, longitudinal slots 101 through which pass screws 102 that are threaded in the shell of the cylinder so that by loosening the screws the rings can be shifted around the platen cylinder and then clamped at any desired point. The platen cylinder must be prepared for use by applying a raised surface 103 by pasting a number of wrappers on the shell so that this raised surface will form a support for the wrapper while it is gummed.

Mounted in front of the platen cylinder is the surface gumming roll or drum D. This roll may be provided with a rubber cover 104 that is adapted to receive liquid gum or paste and apply it to the wrapper on the platen cylinder. The surface gumming roll is journaled at its ends on a pair of arms 105 that are mounted on journals 106 of the gum feeding roll 107. The arms 105 are adjustable on these journals so that the surface gumming roll D can be supported in such a position that it will apply gum to the entire surface of each wrapper when the latter is used for tight wrapped boxes, but it can be adjusted to another position where it will act as a transfer roll between the gum-feeding roll 107 and the marginal gumming roll E for applying gum to the latter. The arms 105 are formed with depending spaced ears or lugs 108, as clearly shown in Fig. 26, and between these lugs extends an abutment 109 on the gumming tank or fount F, and in the lugs 108 are adjusting screws 110 so arranged that by loosening one and tightening the other screw the surface gumming roll D will be shifted to either of its operative positions. It will be understood that both ends of the gumming roll must be adjusted to the same extent in order that it will be parallel with the platen cylinder or marginal gumming roll.

The gumming fount F is mounted on a bracket 111 supported by the main frame L and the gum-feeding roll 107 is so mounted that the lower portion thereof will rotate in the gum. The excess gum is removed by a cut-off roll 112 mounted on arms 113 pivoted at 114 on the ends of the tank or fount F, said roll 112 being held in peripheral engagement with the gum-feeding roll 107. This roll 107 is adapted to rotate in one direction when surface gumming the wrappers, and in the opposite direction when marginally gumming the wrappers, and hence separate scraping rolls 112 are employed to operate on the feed roll 107. These scraping rolls are located at approximately diametrically opposite points, and the arms 113 thereof are connected together by an element 115 which constitutes a turn buckle, and on this element are threaded nuts 116, either of which can be screwed against a projection 117 on the fount F so as to hold either gum-gaging or cut-off roll 112 in proper relation to the feeding roll 107. Under the fount F is a steam chest 117 whereby the gum can be kept at the proper consistency.

The marginal gumming roll or drum E is shown in detail in Figs. 5 to 7, inclusive, and the same consists of heads 118 supporting a cylindrical shell 119 and secured to a horizontal shaft 120 mounted in brackets 121 so that the marginal gumming drum will be located above the platen cylinder and the surface gumming roll D. As the marginal roll is intended to gum only the edges of the wrapper, it is provided with a gum-applying surface 122 which conforms to the configuration of the wrapper. In order that the gumming surface can be changed for any desired configuration or size of wrapper, the said surface 122 is made up of numerous block-like sections 123 which are removably secured to the drum. In order to secure these sections to the drum the shell 119 of the latter has longitudinal and transverse rows of apertures 124 into which the stems 125, Figs. 8 and 9, on the blocks are inserted. These stems are slightly enlarged at their inner ends 126 so that after the stem is inserted, the enlargement thereof will serve to hold the block in place. These blocks and stems are preferably, although not necessarily, made of rubber, and the under side of each block is curved on an arc of slightly greater curvature than the shell of the drum, so that when pressure is applied to each block, the middle of the block will yield toward the shell and as a consequence the ends of the blocks will not lift, and at the same time better joints between adjacent blocks will be formed. If desired, extra retaining means may be employed for each block, such means consisting of an arrow-shaped wire 127 which has portions embedded in the stem and block, and the corners 128 will form yielding anchoring means to hold the blocks in place, as the said corners will engage the inner surface of the shell 119. When the surface gumming roll D is in the position shown in Fig. 1, it acts to apply gum to the surface 122 formed by the blocks 123 of the marginal gumming roll, and as the latter rotates, the gum on this surface 122 will be applied to the wrapper which is traveling with the platen cylinder.

The delivery table G is a flat plate of octagonal or any other desired form that is mounted on a central stem or post 124' that rotates in a pedestal 125' rising from the base of the main frame L. This table is located above the pile holder and approximately in tangential relation to the top of the platen cylinder so that the periphery 126' of the table, which is tapered almost to a sharp edge, will be in the proper position to receive the gummed labels directly from the platen cylinder. In the present instance, the table rotates and is adapted to have four steps in each rotation. The rotation of the table is so timed with the rotation of the platen cylinder that the table will move one step while a wrapper is being gummed on the platen cylinder and will then be followed by an idle period while a gummed wrapper is being transferred to the table from the platen cylinder. This step by step rotation of the table is effected by a ratchet wheel 127', Figs. 1 and 15, fastened to the stem 124' and engaged by a pawl 128' that is mounted on an arm 129 that swings on the pedestal 125'. This arm is provided with a stud 130 which extends into a slot 131 in an operating rod 132, the said rod having one end hingedly connected with a lever 133 which is fastened to a sleeve 134, Fig. 28, that surrounds the shaft 32. Attached to this sleeve 134 is an upwardly-extending arm or lever 135 that is provided with a roller 136 which rides on the cam 35. This cam comes into play upon the lever 133 immediately after a gummed wrapper has been transferred to the table and causes the rod 132 to move the pawl 128' forwardly to turn the ratchet wheel 127' a quarter turn thereby carrying a gummed wrapper to the operator and throwing an empty portion of the table in line with the platen cylinder to receive the next gummed wrapper. At each side of the center of the table and in diametrical lines thereof is a pair of gages 137 into engagement with which a gummed wrapper is brought by the transfer mechanism H. These gages are supported on horizontal rods 138 extending parallel with each other and slidable laterally in the slots 139 located adjacent the center of the table. The rods 138 are secured in any position of lateral adjustment by bolts 140 and the gages 137 are shiftable longitudinally of the rods 138 and clamped thereto by set screws 141. The gages 137 are so set that they will engage the corners of the wrappers, as clearly shown in Figs. 2 and 32. On one of the rods 138 are adjustable box gages 142 and 143 so as to enable the operator to centrally position the box over the gummed wrapper. After being thus positioned, the box is pressed against the gummed wrapper so that the latter will adhere to the box as it is removed and placed in a wrapping machine or on a table where the boxes are manually wrapped.

Disposed over the table at a point adjacent the platen is the main transferring mechanism H, the same consisting of endless belts 144 that pass around pulleys 145 and 146 on the shafts 147 and 148, respectively. The shaft 148 is mounted in the end of the swinging frame 149 which is mounted to swing on the shaft 147 so that the transferring mechanism can be raised preparatory to the movement of the table to provide sufficient clearance for the wrapper and box gages carried by the table. On the endless belts 144 are grippers 150 which, as shown in Figs. 1, 17 to 19, inclusive, are pivoted in bearings 151 fastened to the endless belts, the said grippers being held open by springs 152 coiled around the pivots 153. The belt is provided with lugs or teeth 154 against which the grippers clamp the gummed wrapper. The grippers 150 engage the under or ungummed side of the wrappers, while the teeth or projections 154 grip the gummed side. On the table are track plates 155 on which the free edges of the grippers ride, as shown by full lines in Fig. 18, so as to hold the grippers closed on the wrapper while the latter is being transferred to the table. The plates 155 are of such length that the grippers will ride off the inner ends thereof when the gummed wrapper has reached the gages 137. The grippers open at this point and release the wrappers when the gages 137 are reached, although the transfer belts continue to move. The plates 155 are adjustable longitudinally on the table and are clamped in any desired position of adjustment by bolts 156, Fig. 1, passing through slots 157 in the table, and by means of this adjustment, the grippers can be caused to open at the proper time. The grippers close on the front edge of the wrapper while such edge is being raised off the platen, as shown in Figs. 1, 3 and 13 by the lifting fingers on the grippers of the platen cylinder. After the gummed wrapper has been transferred to the table and released by the transfer mechanism H, the frame 149 of the latter is swung upwardly to allow the delivery table to make a quarter turn. This upward movement is effected by means of a link 158, Fig. 3, connecting an arm 159 with the arm 135 of the lever 133, which operates the table ratchet device, the said arm 159 being connected with the end of the hub on swinging arm 149. In other words, when the lever 133 is tilted by the cam 35, the rod 158 will be pulled downwardly to cause the transfer mechanism H to move to the first dotted line position, Fig. 3, and at about this time the ratchet pawl 128' engages the ratchet wheel 127' and revolves the table G a quarter turn, and after this is done, the transfer mechanism H lowers and the pawl 128' is retracted.

The secondary transfer mechanism I is located under the table G at a point under the main transfer mechanism H. This mechanism I consists of endless belts 160 and 161 and these belts are adapted to be raised through slots 162 in the table G into engagement with the under side of the gummed wrappers so as to prevent any drag on the latter by coming in contact with the table surface. In other words, these belts 160 and 161 form a traveling carrier to support the wrapper, particularly the end portions thereof, off the table. The belts pass around pulleys 163 mounted on the shaft 164, which shaft is carried by arms 165. The arms 165 are carried by a shaft 166 disposed in bearings 167 on the main frame L, as shown in Figs. 3 and 4. The opposite ends of the belts 160 pass around pulleys 168, while the belts 161 pass around pulleys 169. These pulleys 168 and 169 are mounted, respectively, on arms 170 and 171 loosely supported on a shaft 172, Figs. 3 and 29, which shaft is carried by arms 173 fastened on the shaft 174. This shaft 174 is supported by standards 179 rigidly secured to the frame of the machine. Also secured to the shaft 174 is a short arm 180 which is connected by a rod 181 with an arm 182 rigidly secured to the shaft 166. On this shaft 166 is an arm 183, Fig. 4, that carries a cam roller 184 that is adapted to ride on the cam 185 fastened to the shaft of the platen cylinder. This cam operates through the arm 183 to rock the shaft 166 which throws the arms 165 upwardly to elevate the front ends of the belts 160 and 161 and the said shaft 166 by operating through the arms 182, link 181 and arm 180, rocks the shaft 174, which in turn causes the arms 170 and 171 to raise the rear ends of the belts 160 and 161. Owing to the difference in the length of the arms 182 and 180, the rock shaft 174 will have a greater movement than the shaft 166 so that the up and down movement of the rear ends of the belts 160 and 161 will be somewhat greater than at the front ends. The arms 170 and 171 are yieldingly sustained by a spring 186 that is connected with the said arms and with the shaft 174. The operating cam 185 is so arranged that the belts 160 and 161 will be supported in wrapper-engaging position as the wrapper is being transferred to the delivery table from the platen cylinder and as soon as this transfer movement ceases, the cam will permit the belts 160 and 161 to drop out of the slots 162 of the table so that the latter can turn and carry the deposited wrapper around to the next position. On the shaft 166 is arranged a catch 187, Fig. 3, in the form of a finger that is adapted to enter recesses 188 formed in blocks 188' fixed on the bottom of the table at four points ninety degrees apart, Figs. 1, 2 and 3, so that the table will be locked stationary during the time the gummed wrapper is being transferred thereto. This locking member 187 is automatically thrown into and out of locking position by the rocking of the shaft 166 which elevates and lowers the belts 160 and 161.

Power is transmitted to the machine by a belt pulley 189 loosely mounted on a sleeve 190 on the shaft 32 and also on this sleeve is a pinion 191 which can be clutched by a treadle controlled pin 192, Fig. 27, to the driving pulley 189. This pinion meshes with a large gear wheel 193 on the shaft on the platen drum, which gear in turn meshes with a gear wheel 194 secured to the shaft of the marginal gumming drum E. The surface gumming roll D has a gear 195 that is adapted to mesh with either the gear wheels 193 or 194. The gear 195 drives the gum-feeding roll 107 by meshing with a gear wheel 197 fastened to such gumming roll. The transfer belts 144 of the mechanism H are driven from the gear wheel 194 by means of a pinion 198 meshing therewith and with a gear wheel 199 on the shaft 147. The belts of the secondary transfer mechanism are driven by means of a cross belt 200, Fig. 4, passing around pulleys 201 and 202 on the shaft 164 and stud 203, respectively, there being on the latter stud a pinion 204 that meshes with the gear wheel 193 on the platen cylinder.

When the marginal gumming drum E is not in use, it can be raised out of coöperative relation with the platen cylinder by loosening the screws 205 which press against sliding bearing boxes 206 in the brackets 121, there being springs 207 which raise the bearing boxes when the screws 205 are turned upwardly. On this marginal gumming drum, gum-applying blocks 208 will be arranged thereon at a point within the area surrounded by the gumming surface 122 so that patches of gum 209, Fig. 30, may be applied to the wrapper so that when the box is placed on the latter by the attendant, the wrapper will adhere to the box as it is removed and carried to the wrapping machine. The drum E is not raised far enough to disengage the teeth of the gear wheel 194 from the gear wheel 193, so that the belts 144 will still be driven from the latter gear wheel through the gear 194, pinion 198 and gear wheel 199.

From the foregoing description, taken in connection with the accompanying drawings, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, is:—

1. In a gumming machine for box wrappers, the combination of a wrapper-carrying platen, a device adapted to be set for gumming the entire surface of wrappers carried by the platen, and another device adapted to be set for gumming the marginal edges of wrappers carried by the platen, said devices being mounted for coöperative use with the platen only one at a time.

2. In a gumming machine for box wrappers, the combination of a platen, means for automatically delivering wrappers successively thereto, a gum-applying device arranged to apply gum to the entire surface of the wrappers on the platen, and another device capable of use interchangeably with the first to apply gum to the marginal edges of the wrappers, said devices being mounted for coöperative use with the platen only one at a time.

3. In a gumming machine for box wrappers, the combination of a wrapper-carrying platen, a device for gumming the marginal edges of wrappers on the platen, and a separate device adjustable to apply gum to the entire surface of the wrappers or to supply gum to the first-mentioned device.

4. In a gumming machine for box wrappers, the combination of a wrapper-carrying platen, a device for gumming the marginal edges of wrappers on the platen, a separate device adjustable to apply gum to the entire surface of the wrappers or to supply gum to the first-mentioned device, and means for feeding gum to the last-mentioned device in either of its operative positions.

5. In a gumming machine for box wrappers, the combination of a rotary platen cylinder, means for feeding wrappers thereto, a surface gumming roll disposed in coöperative relation with the platen, a marginal gumming roll arranged in coöperative relation with the platen, and means for supporting the surface gumming roll to be shifted from the platen to the marginal gumming roll to apply gum to the latter.

6. In a gumming machine for box wrappers, the combination of a rotary platen cylinder, means for feeding wrappers thereto, a surface gumming roll disposed in coöperative relation with the platen, a marginal gumming roll arranged in coöperative relation with the platen, means for supporting the surface gumming roll to be shifted from the platen to the marginal gumming roll to apply gum to the latter, and a gum-feeding roll arranged at all times in contact with the surface gumming roll to supply gum thereto.

7. In a gumming machine for box wrappers, the combination of a wrapper-carrying platen, separate gumming devices, a gum fount, means for supplying gum from the fount to one of the devices, and means for supporting such device on the fount to act as a means for supplying gum to the wrapper when in one position, and when in another position to serve as a means for transferring gum from the fount to the other gumming device.

8. In a gumming machine for box wrappers, the combination of a wrapper-carrying platen, means for applying gum to the wrappers, a fount, a feed roll partially submerged in the fount and in contact with the said means, means for supporting the gum-applying means out of coöperative relation with the platen, a second gum-applying means disposed in coöperative relation with the platen and adapted to receive gum from the first-mentioned applying means, and separate devices at the fount for controlling the amount of gum taken up by the said roll.

9. In a gumming machine for box wrappers, the combination of a wrapper-carrying platen, a marginal gumming roll, a surface gumming roll, means for supporting the surface gumming roll to apply gum directly to wrappers on the platen or to the marginal gumming roll, gum-feeding means disposed in contact with the surface gumming roll, separate cut-off devices for controlling the amount of gum on the last means, and means for adjusting either device to operative position.

10. In a gumming machine for box wrappers, the combination of a wrapper-carrying platen, separate gum-applying devices disposed in coöperative relation therewith, a gum-feeding roll in contact with one of the devices, a fount in which the roll rotates, means for supporting the device in contact with the drum to be adjustable concentric therewith for shifting from the platen to the other device, means for adjusting the position of such shiftable device, cut-off rolls mounted on the fount, and a common means for throwing one of the cut-off rolls into operative position with respect to the feed roll and the other out of operative position.

11. In a gumming machine for box wrappers, the combination of a wrapper-carrying platen, means for applying gum to the wrappers, a fount, a feed roll partially submerged in the fount and in contact with the said means, means for supporting the gum-applying means out of coöperative relation with the platen, a second gum-applying means disposed in coöperative relation with the platen and adapted to receive gum from the first-mentioned applying means, and means at the fount for controlling the amount of gum taken up by the said roll.

12. A gumming machine for box wrappers including a gum-applying device consisting of an inflexible perforated hollow cylindrical shell, a gumming surface alterable to conform to the marginal edges of wrappers of different sizes and shapes, and means insertible through the perforations of said shell for fastening the surface to the said shell.

13. A gumming machine for box wrappers including a gum-applying device consisting of an inflexible perforated hollow cylindrical shell, a gumming surface alterable to conform to the marginal edges of wrappers of different sizes and shapes, said surface being made in sections, and means on each section insertible through the perforations of said shell for securing the same to the said shell.

14. A gumming machine for box wrappers including a gum-applying device consisting of an inflexible perforated hollow cylindrical shell having intersecting rows of perforations, a gumming surface substantially similar to the outline of the wrapper to be gummed and fastened to the shell by engaging through the perforations thereof, and additional shiftable gumming surfaces arranged within the space inclosed by the first mentioned gumming surface and held on the said shell by engaging through the perforations thereof.

15. In a gumming machine for box wrappers, the combination of an inflexible hollow cylindrical support having spaced perforations, a gum-applying surface formed of blocks, stems on the blocks insertible through and removable from said perforations, and retaining devices on the stems adapted to engage the inside surface of said support.

16. In a gumming machine for box wrappers, the combination of an inflexible hollow cylindrical shell having spaced perforations, blocks mounted on the outer surface of the shell and each separately removable therefrom, and stems on the blocks insertible through and removable from said perforations.

17. In a gumming machine for box wrappers, the combination of a drum formed of heads and a shell, said shell having apertures, arcuate blocks of resilient material having a curvature of less radius than the radius of the shell, and resilient stems on the blocks for fitting in the apertures to removably support the blocks on the circumference of the shell.

18. In a gumming machine for box wrappers, the combination of a cylindrical support, with a gum-applying surface thereon to conform with the outline of a wrapper, said surface being composed of separable sections made of yielding material and removably mounted on the support with their under sides resting on the support.

19. In a gumming machine for box wrappers, the combination of a wrapper-gumming means, a delivery table disposed in coöperative relation therewith, means for moving the table step by step, gages on the table for the gummed wrappers, a transfer mechanism for delivering the wrappers to the table, and means operatively connected with the transfer mechanism for lifting the same out of the path of the gages preparatory to the moving of the table.

20. In a gumming machine for box wrappers, the combination of a wrapper-gumming mechanism, a delivery table movable with respect thereto, means for periodically moving the table, a device arranged to transfer the gummed wrappers from the mechanism to the table, driving means for the said device, wrapper gages on the table, and an actuating mechanism operatively connected with the transfer device for lifting the latter from the table preparatory to the movement thereof.

21. In a gumming machine for box wrappers, the combination of a wrapper-gumming mechanism, a periodically rotated delivery table, and separate transfer devices arranged to operate simultaneously on opposite sides of the wrappers for conveying them from the mechanism to the table.

22. In a gumming machine for box wrappers, the combination of a wrapper-gumming mechanism, a periodically rotated delivery table, separate transfer devices arranged respectively above and below the table to operate simultaneously for conveying gummed wrappers from the mechanism to the table, and means for simultaneously moving the devices upwardly and downwardly respectively away from the table preparatory to the movement of the latter.

23. In a gumming machine for box wrappers, the combination of a wrapper-gumming mechanism, a delivery table, means for moving the table step by step, and coacting transfer devices arranged respectively above and below the table to convey the gummed wrappers to the latter.

24. In a gumming machine for box wrappers, the combination of a wrapper-gumming mechanism, a delivery table, means for moving the table step by step, coacting transfer devices arranged respectively above and below the table to convey the gummed wrappers to the latter, and means for moving the transfer devices away from the table preparatory to the movement of the latter.

25. In a gumming machine for box wrappers, the combination of a wrapper-gumming mechanism, a delivery table, separate transfer devices including endless belts disposed above and below the table, the under set of belts serving to form a moving support for the gummed wrappers, and means on the upper belts for gripping the gummed wrappers to convey them upon the table.

26. In a gumming machine for box wrappers, the combination of a wrapper-gumming mechanism, a delivery table, separate transfer devices including endless belts disposed above and below the table, the under set of belts serving to form a moving support for the gummed wrappers, means on the upper belts for gripping the gummed wrappers to convey them upon the table, and means for moving the belts away from table preparatory to the movement of the latter.

27. In a gumming machine for box wrappers, the combination of a gumming mechanism, a delivery table arranged in coöperative relation thereto, transfer belts disposed over the table, grippers on the belts for gripping the gummed wrappers and conveying them from the mechanism to the table, gages on the table, means for releasing the wrapper when the same reaches the gages, and a movable belt support for throwing the belts out of the path of the gages preparatory to the movement of the table.

28. In a gumming machine for box wrappers, the combination of a gumming mechanism, a rotary table, means for moving the table step by step, transfer belts disposed above the table to convey gummed wrappers from the mechanism to the latter, wrapper gages on the table, a swinging support for raising the belts out of the path of the gages prior to the movement of the table, a shaft on which the support is mounted, and driving means on the shaft for actuating the belts.

29. In a gumming machine for box wrappers, the combination of a gumming mechanism, a movable delivery table, wrapper-carrying belts disposed under the table, and means for moving the belts into and out of wrapper-engaging position to permit the table to move.

30. In a gumming machine for box wrappers, the combination of a gumming mechanism, a delivery table having sets of slots, means for moving the table step by step, wrapper-carrying belts movable into and out of the slots to and from wrapper-engaging position, means for moving the belts out of the slots preparatory to the movement of the table, and means for driving the belts.

31. In a gumming machine for box wrappers, the combination of a gumming mechanism, a delivery table having sets of slots, means for moving the table step by step, wrapper-carrying belts movable into and out of the slots to and from wrapper-engaging position, means for moving the belts out of the slots preparatory to the movement of the table, means for driving the belts, and means for alining the table with the belts at the end of each step in its movement.

32. In a gumming machine for box wrappers, the combination of a gumming mechanism, a delivery table, a rod mounted on the table, a wrapper gage on the rod, a second gage on the rod for the end of a box, and a third gage on the rod for the side of a box.

33. In a gumming machine for box wrappers, the combination of a gumming mechanism, a delivery table, a supporting element adjustably mounted on the table, a wrapper gage adjustable longitudinally of the element, a box gage adjustable longitudinally of the element, and another box gage adjustable transversely of the element.

34. In a gumming machine for box wrappers, the combination of a gumming mechanism, a delivery table, adjustable wrapper gages mounted on the table, rods forming supports for the gages, means for supporting the rods for lateral adjustment on the table, box gages also mounted on the said rods and adjustable thereon independent of the wrapper gages, and a mechanism for transferring gummed wrappers from the gumming mechanism to the table and releasing them at the first-mentioned gages and under the box gages.

35. In a gumming machine for box wrappers, the combination of a gumming mechanism, a delivery table, a pair of supporting elements adjustable on the table toward and away from each other, a wrapper gage adjustably mounted on each element, and independently adjustable box gages mounted on one of the elements.

36. In a gumming machine for box wrappers, the combination of a gumming mechanism, a delivery table, a pair of elements mounted thereon, a wrapper gage on each element, one element extending beyond its wrapper gage, and box gaging means mounted on the extending portion of the said element.

37. In a gumming machine for box wrappers, the combination of a wrapper-carrying platen, raised portions of the platen arranged in spaced relation to each other at their extremities and forming supporting means for certain marginal portions of the blank which marginal portions lie outside of the remainder of the wrapper after the latter is fully applied to a box, and a marginal gumming device.

38. In a gumming machine for box wrappers, the combination of a wrapper carrying platen, a raised portion of the platen conforming in size and shape to the size and shape of the blank to be gummed, a marginal gumming device, and another device adapted to be set for gumming the surface of wrappers carried on the raised portion of the platen.

39. In a gumming machine for box wrappers, the combination of a platen, with a gumming device consisting of a shell having apertures, and a gumming surface having elastic stems insertible into the apertures and extending entirely through the same whereby portions of the stem project out of the apertures and expand to a size larger than the latter for retaining the said gumming surface on the shell.

40. In a gumming machine, the combination of wrapper-carrying means, with a device for applying gum to the wrapper, said device comprising a perforated body, and a rubber block resting on the surface of the body and having a rubber stem of such size as to be compressed in passing through a perforation of the body and of such length as to extend out of the perforation whereby the extended end expands beyond the diameter of the perforation to retain the block in position.

41. In a gumming machine, the combination of a wrapper-carrying means, with a gum-applying device consisting of a body having perforations, blocks on the body, and rubber stems on the blocks having enlarged extremities compressible to pass through the perforations and to extend beyond the latter when the blocks are seated on the said body whereby the enlarged ends of the stems retain the blocks in place against accidental displacement and detachment.

42. In a gumming machine, a gum-applying device comprising a drum formed of a shell having perforations, a plurality of independently attached and separately detachable blocks on the circumference of the shell forming a gum-applying surface, said blocks being made of yielding material and having integral stems to fit in the perforations and longer than the latter whereby the extremities of the stems are disposed outside the apertures and are of larger diameter than the latter to yieldingly retain the said blocks in place.

43. In a gumming machine for box wrappers, the combination of a wrapper gumming machine, separate transfer devices including endless belts arranged to extend above and under a wrapper in transference from the gumming mechanism, the under set of belts serving to form a moving support for the gummed wrappers, means on the upper belts for gripping the gummed wrappers to transfer them from the gumming mechanism, a delivery table disposed in a plane between the upper and lower transfer device, means for moving the devices simultaneously in opposite directions away from the table, and means for moving the table after the devices are moved away from the same.

In testimony whereof I affix my signature in presence of two witnesses.

ROBERT S. BOLGER.

Witnesses:
　Gus A. Meyer,
　Joseph J. Sazama.